(12) United States Patent
Lutfey

(10) Patent No.: US 7,825,545 B2
(45) Date of Patent: Nov. 2, 2010

(54) ENERGY CONSERVATION AND CONTROL SYSTEMS

(76) Inventor: Omar Lutfey, 1927 Big Sandy Pl., Loveland, CO (US) 80538

( * ) Notice: Subject to any disclaimer, the term of this patent is extended or adjusted under 35 U.S.C. 154(b) by 230 days.

(21) Appl. No.: 12/152,483

(22) Filed: May 14, 2008

(65) Prior Publication Data
US 2009/0284085 A1 Nov. 19, 2009

(51) Int. Cl.
H01H 9/54 (2006.01)
(52) U.S. Cl. ................................. 307/140
(58) Field of Classification Search ......... 307/140
See application file for complete search history.

(56) References Cited

U.S. PATENT DOCUMENTS

| | | | |
|---|---|---|---|
| 6,112,127 A | 8/2000 | Bennett | |
| 6,523,124 B1 * | 2/2003 | Lunsford et al. | 713/320 |
| 6,792,323 B2 | 9/2004 | Krzyzanowski et al. | |
| 7,124,184 B2 | 10/2006 | Chung | |
| 7,190,267 B2 | 3/2007 | Vaserfirer | |

* cited by examiner

Primary Examiner—Robert L. Deberadinis
(74) Attorney, Agent, or Firm—James R. Young; Cochran Freund & Young LLC

(57) ABSTRACT

Energy conservation and control systems, devices, processes and methods are disclosed. The conservation and control systems, devices, processes and methods may be used or performed in combination with one or more electronic devices and systems comprising a plurality of devices, such as but not limited to entertainment systems and other appliance systems. The invention comprises in some embodiments control systems, devices, processes and methods, alone or in combination with or performed with the electronic devices or accessory devices generally, such as remote controls or other accessory hardware. The invention in some embodiments are conservation and control retention devices, as well as methods and processes thereof, having an accessory device retention element and a conservation function element configured with the accessory device retention element. The conservation and control retention device and methods and processes provide functionality such that when the user of an accessory device inserts the accessory device into the accessory device retention element, not only is the accessory device retained but the conservation function element removes power to the one or more electronic devices.

28 Claims, 2 Drawing Sheets

ENERGY CONSERVATION AND CONTROL SYSTEMS

BACKGROUND OF THE INVENTION

Technologies for the control of electronics are well known and are particularly applied in the implementation of electrical systems such as in residential and commercial structures, power supplies, and power extension systems. Energy conservation technologies relating to electronics and electrical systems have historically dominated the market as simple power on and off functions of the devices themselves and as power extension systems for electrical components.

Various forms of electronic control for electronic devices such as stereos, media players, TVs, kitchen appliances, and others have been previously developed as features of those devices to aid in controlling the function of and the on or off state of the device, including but not limited to on and off functionality of the device, such as an on and off switch, and power extension devices otherwise known as power extension devices or power strips that provide electrical receptacles to power multiple electronic devices. The user of the electronic device would traditionally shut off the device or multiple devices, such as an entertainment system and electronic device thereof, when not in use. However, a user of the electronic device or multiple devices might frequently forget to turn off each devices or find that turning off each electrical device is undesirable, and thus allowing the device to remain in a power on state and creating a draw of electricity and electrical power consumption that is both a waste of electrical power and is not cost effective in power consumption. Furthermore, some electronic devices may continue to draw power from a power source despite being put into an off state and that may continue to be considered inefficient or not cost effective.

Another traditional option would be to turn off power to one or more electronic devices via a power strip, and the power strip on and off switch, or by more advanced systems that offer timing control of multiple devices, such as timers. However, the power strip suffers from the same potential of the user forgetting to shut off the devices, as the user may simply forget to shut off the power strip, or may still find that removing power from the electronic devices via the power strip too inconvenient, possibly due to the location of the power strip and the location from which the user typically interacts with and controls the electronic devices. Furthermore, more advanced electronic systems such as timers and other systems may be undesirably complex to program and may still suffer from being in an inconvenient location relative to the location from which the user typically interacts with and controls the electronic devices. Additionally the timer and other systems may still allow power to be supplied to the electronic devices in an off state that would be considered to be inefficient or not cost effective given the devices may continue to draw power.

Although the knowledge of the continuing draw of electricity and electrical power consumption is known in the art of electronic devices, and may be intentionally provided for certain features of the devices to function, such as in internal clock function, preferred systems may not have been heretofore provided to address reducing or eliminating the continuing draw of power while also accounting for the typical use scenario for users of electronic devices. The traditional technology may not have particularly addressed the likely location from which the user not only typically interacts with and controls the electronic devices, but further the location from which the user would typically turn off the electronic devices after use. Traditional technology has also not further addressed reducing the potential for forgetting to turn off the devices while also removing power to the devices to avoid inefficiency and costs.

SUMMARY OF THE INVENTION

Energy conservation and control systems, devices, processes and methods are disclosed that are provided to address the inefficiency and costs associated with operating and powering electronic devices and systems. The invention is further provided to address the location from which the user would typically turn off the electronic devices after use, as well as a typical and repeated action on the part of the user, in some preferred embodiments. The conservation and control systems, devices, processes and methods may be used or performed in combination with one or more electronic devices and systems comprising a plurality of devices, such as but not limited to entertainment systems and other appliance systems. The invention comprises in some embodiments control systems, devices, processes and methods, alone or in combination with or performed with the electronic devices or accessory devices generally, such as remote controls or other accessory hardware, hardware that in some embodiments may be physically distinct from one or more of the electronic devices.

The invention in some embodiments may comprise a conservation and control retention device, having an accessory device retention element and a conservation function element electrically connected with a power supply and at least one electronic device, the conservation function element in some embodiments being integral with the accessory device retention element. The conservation and control retention device provides functionality in some embodiments such that when the user of an accessory device of the one or more electronic devices inserts the accessory device into the accessory device retention element, not only is the accessory device retained but the conservation function element removes power to the one or more electronic devices.

The conservation and control retention device addresses the provision of the functionality of the invention being provided at a location from which the user would typically turn off the electronic devices after use, as well as a typical and repeated action on the part of the user that reduces the possibility of the devices not being powered off or the devices not being electrically disconnected from the power supply. Furthermore, the conservation and control retention device addresses the removal of power supplied to the electronic devices, even if the devices are in an off state, so as to address such devices from continuing to draw power and the corresponding inefficiencies and cost savings.

The invention in some embodiments may also comprise an electronic device, having an accessory device retention element and a conservation function element electrically connected with a power supply and integral with the accessory device retention element, and in some embodiments wherein the accessory device retention element and the conservation function element are electronically and functionally integral with the electronic device. The electronic device of the present invention provides functionality such that when the user of an accessory device of the electronic device inserts the accessory device into the accessory device retention element, not only is the accessory device retained but the conservation function element removes power to the electronic device.

This embodiment of the invention also addresses the provision of the functionality of the invention being provided at a location from which the user would typically turn off the electronic devices after use, as well as a typical and repeated action on the part of the user that reduces the possibility of the devices not being powered off or the devices not being electrically disconnected from the power supply. Furthermore, the conservation and control retention device addresses the removal of power supplied to the electronic device or devices, even if the device is in an off state, so as to address such device from continuing to draw power and the corresponding inefficiencies and cost savings.

Processes and methods of conservation and control are also disclosed as embodiments of the invention, both being disclosed specifically as steps of the invention as well as in the functionality of the devices and systems disclosed.

DETAILED DESCRIPTION OF PREFERRED EMBODIMENTS OF THE INVENTION

Figure 2:
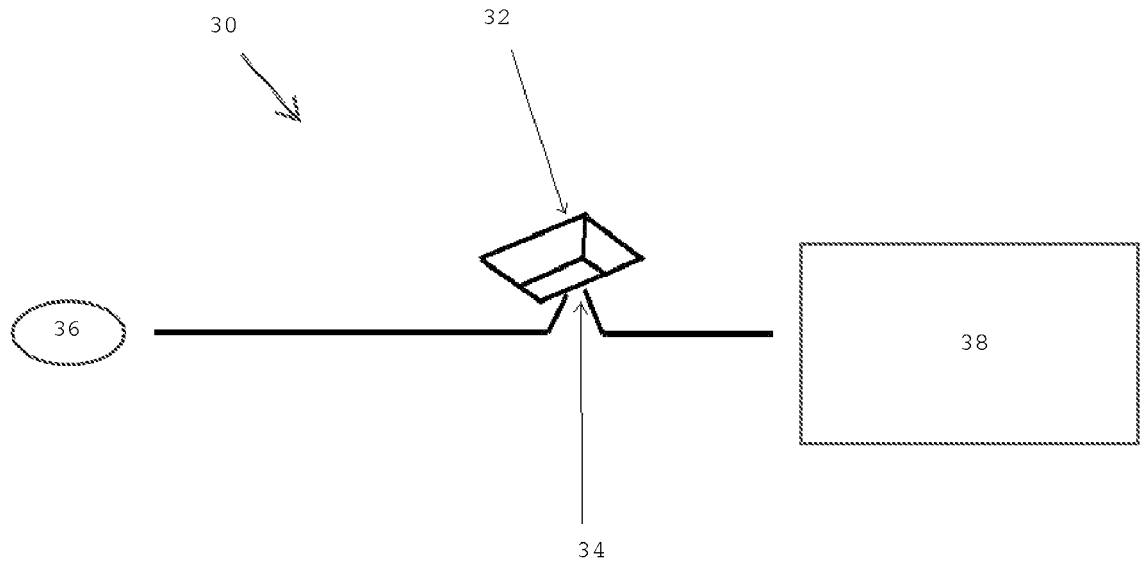
FIG. 2 is a diagram of a second embodiment of the present invention.

The present invention is described in preferred embodiments that address one or more inadequacies of the prior art. Accordingly, embodiments of the invention are shown and described in the Figures, written description, and claims and throughout the disclosure of this application.

The present invention in preferred embodiments is embodied as a retention device, such as a remote control holder, or in still further embodiments as integral with one or more electronic devices, such as an integral remote control holder. The term integral may be described in respect to a retention device that is provided as part of the electronic device, such as part of the housing of the electronic device, or is connected with the electronic device. Alternative embodiments of the present invention may comprise a retention device that is associated with the electronic device, such as a retention device provided with the electronic device, connected with the electronic device, or located corresponding to a location of the electronic device. Each of these embodiments is disclosed herein. Accordingly, preferred embodiments of the invention may be provided for use or installation in the typical location wherein a remote may be used, such as the listening or viewing location of a user, or in or upon the electrical device or devices. The invention may also be mounted to a surface, such as a wall or table, or other supportive surface understood by those skilled in the art and to which previous technologies such as remote controls and other electronic accessories have been applied.

Furthermore, the present invention in some preferred embodiments provides a conservation function element that in preferred embodiments comprises a switch in electrical connection with a power supply and other components of an electrical circuit, either internally or as part of one or more electronic devices, or as an external component. The electrical conservation element may be, in some preferred embodiments, an electrical switch that is mechanically operable in association with an accessory device. However, the invention may further comprise embodiments incorporating other known electrical switch or control elements that may be known to those skilled in the art and that function in accordance with the present invention.

Energy conservation and control systems, devices, processes and methods are disclosed that are provided to address the inefficiency and costs associated with operating and powering electronic devices and systems. The invention is further provided to address the location from which the user would typically turn off the electronic devices after use, as well as a typical and repeated action on the part of the user, in some preferred embodiments. The conservation and control systems, devices, processes and methods may be used or performed in combination with one or more electronic devices and systems comprising a plurality of devices, such as but not limited to entertainment systems and other appliance systems. The invention comprises in some embodiments control systems, devices, processes and methods, alone or in combination with or performed with the electronic devices or accessory devices generally, such as remote controls or other accessory hardware, hardware that in some embodiments may be physically distinct from one or more of the electronic devices. In alternative embodiments, accessory devices may not be limited to remote controls, but could include headsets, digital players, or other similar accessories.

Figure 1:
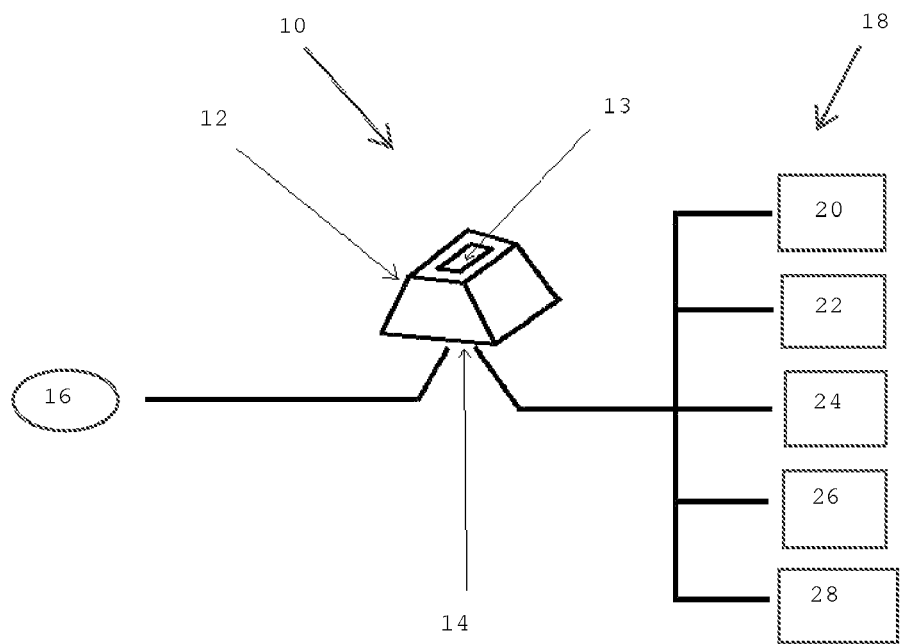
FIG. 1 is a diagram of an embodiment of the present invention.

Now in reference to FIG. 1, an embodiment of the present invention is shown as a retention device 10. The retention device 10 has features that in accordance with the invention are conservation type elements to address reducing the draw of electrical power and consumption from electronic devices. Furthermore, retention device 10 is a control of electrical current from a power supply to one or more, and at least one, electronic device. Accordingly, some embodiments of the invention are referred to as conservation and control retention devices.

Again in reference to FIG. 1, and in reference to retention device 10, an accessory device retention element 12 is shown. Retention element 12 may be an accessory device holder, such as remote control holder used traditionally for the placement and retention of a remote control, such as within recess 13. Other embodiments of a retention element 12 and accessory device holder can be provided consistent with the type of accessory device used, as previously described. Also shown in FIG. 1 is a conservation function element 14 that is electrically connected, as shown in the figures, with a power supply 16 and at least one electronic device 18. One or more electronic devices, such as shown as electronic devices 20, 22, 24, 26 and 28, may be electrically connected with the conservation function element 14.

The conservation function element 14 in some preferred embodiments is provided as an electrical connection or component and may be integral with the accessory device retention element 12. The term integral may be described in respect to a conservation function element that is provided as part of the retention element 12 or is connected with the retention element. Alternative embodiments of the present invention may comprise a conservation function element 14 that is associated with the retention element 12, such as a conservation function element 14 provided with the retention element 12, connected with the retention element, or located corresponding to a location of the retention element. Each of these embodiments is disclosed herein. In some preferred embodiments conservation function element 14 is an electrical switch, although other elements may be provided consistent with the present invention as previously described.

The conservation function element 14 is responsive to an accessory device and its retention by the accessory device retention element 12. In some preferred embodiments, the functionality may be described as the conservation function element 14 being responsive to a state of retention of an accessory device by the accessory device retention element 12. Accordingly, in some aspects of the present invention, the conservation function element 14 may be provided as a switch that allows electrical connection or disconnection of the power supply 16 from the one or more or at least one electrical device 18. More broadly described, the conservation function element 14, with an electrical switch or some other component, is responsive to the state of retention of the accessory device and correspondingly provides either an electrical connection or disconnection of the power supply 16 from the electrical device or devices 18 depending upon if an accessory device is retained by the accessory device retention element 12. This functionality particularly describes not only the mechanical and electrical components but the steps of methods and processes of the present invention.

In still further embodiments, the conservation function element 14 may be more broadly considered to control the electrical connection of the power supply 16 to the one or more electrical devices 18. In some aspects the control may be manifested as the connection of the power supply 16 to the one or more electronic devices 18, such as when the accessory device retention element is not retaining an accessory device, or the disconnection of the power supply 16 to the one or more electronic devices 18 when the accessory device retention element is retaining an accessory device. However, further and additional embodiments of the invention can provide other electrical control aspects, such as the modification of current, provision of electrical signal, or other such electronic control to the electronic devices as may be appreciated by those skilled in the art. In this manner the amount of power consumption by the electronic device or devices can be controlled and minimized.

As previously described, the conservation function element 14, and more broadly the conservation and control device 10, controls the electrical connection and power consumption corresponding to the location of the accessory device, such as when it is retained or not retained by the accessory device retention element 12, and in some preferred embodiments by disconnecting power to the electronic device or devices. As previously described some preferred embodiments are directed to a remote control as the accessory device and the incorporation of a remote control holder, wherein the remote control holder is a distinct and separate component from the electronic device or devices. However, an alternative embodiment would provide the accessory device retention element 12, such as a remote control retention element, as integral with the at least one electronic device. As previously described, these embodiments may be integral with one or more electronic devices, such as an integral remote control holder, and disclosed as an aspect of the invention as in respect to a retention device that is provided as part of the electronic device, such as part of the housing of the electronic device, or is connected with the electronic device. Alternative embodiments of the present invention may comprise a retention device that is associated with the electronic device, such as a retention device provided with the electronic device, connected with the electronic device, or located corresponding to a location of the electronic device. These alternative embodiments can be provided as aspects of the invention as previously described and in reference to FIG. 1.

Furthermore, another embodiment of the invention is similarly directed to the association of the accessory device retention element 12 and an electronic device as previously described in reference to FIG. 1. Now in reference to FIG. 2, an embodiment of the invention is an electronic device 30, shown as a partial view and diagram of an electronic device in the Figure. An accessory device retention element 32 is shown as well as a conservation function element 34 that is electrically connected with a power supply 36. The conservation function element 34 may be associated with the accessory device retention element 32 as previously described, and in some preferred embodiments integral with the retention element 32 as also previously described. The aspects of the present invention with regard to the embodiment of FIG. 2 are similar in function and application, wherein now the conservation and control features are provided as the electronic device 30. Similarly, the retention element 32 may be an accessory device holder such as a remote control holder for the remote control of the electronic device. The electrical connection may again be integral with the retention element 32 and may comprise an electrical connection, such as an electrical switch, that is integral with the retention element.

Again, as in the features previously described for embodiments of the invention as referenced to FIG. 1, these same features may be incorporated in an embodiment of an electronic device. Accordingly, the conservation function element 34 may be an electrical switch that provides control of the power supply in reference to the other components 38 of the electronic device or devices. As previously described, the control of the conservation function element 34 may be in the provision of electrical connection and disconnection of the power supply from the components 38 of the electronic device or devices. In some preferred embodiments, component 38 may be accessory device detection functionality, as components or functionality of the electronic device. Again, the control may be provided as a response to a state of retention of an accessory device by the accessory device retention element 32, and in some embodiments wherein the power supply is electrically connected or disconnected base upon the retention or non-retention of an accessory device by retention element 32. More broadly stated, the control, and in some embodiments the electrical connection or disconnection, is provided in response to the location of the accessory device, such as in its location and placement for retention respective of the retention element 32, and in some preferred embodiments in respect to the location or retention of a remote control.

Additionally, embodiments of the invention may comprise processes and methods of conservation and control, as well as the control of electronic devices, specifically incorporating the previous functionality described.

Figure 3:
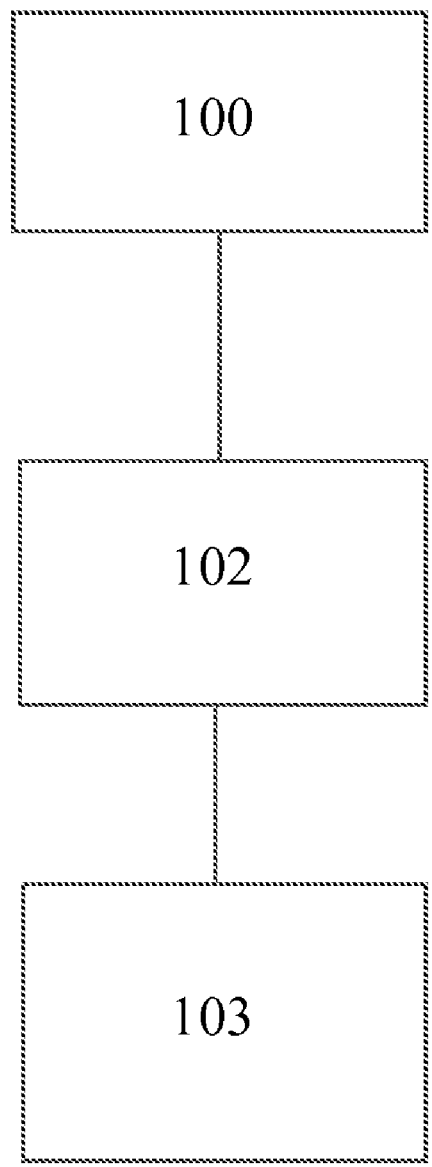
FIG. 3 is a flow diagram of certain embodiments of the present invention.

Now in reference to FIG. 3, and in one embodiment, a process of conservation by control of electrical devices is disclosed. Other embodiments have been previously described; however FIG. 3 shows a process having the three steps of: 100 providing for the retention of an accessory device of at least one electrical device; 102 determining if an accessory device is retained; and 103 controlling the electrical connection of a power supply and the at least one electrical device responsive to the step of determining. Each of these steps and the functionality previously described is further disclosed as steps of the invention. Accordingly, an embodiment may have a step of providing for the retention of the accessory device by an accessory device retention element and the step of determining if an accessory device is retained by an accessory device retention element. Furthermore, the step of providing can be in the provision of a remote control holder, and one that may be integral with the at least one electronic device as previously described.

Furthermore, the step of determining may be the actuating of an electrical connection, such as the electrical switch or the conservation function element, a connection that may be integral with the accessory device retention element. Actuating may be accomplished by removing an accessory device from an accessory device retention element, or in retaining an accessory device with an accessory device retention element, or even in controlling by electrically disconnecting a power supply from the at least one electrical device. As understood from the entire disclosure, each of the functionality features of the present invention is herein disclosed as further steps in the invention.

As can be easily understood from the foregoing, the basic concepts of the present invention may be embodied in a variety of ways. It involves techniques as well as one or more apparatus, device and assembly, as well as devices, assemblages and several apparatus that may provide for the appropriate techniques. In this application, the techniques of the present invention in some embodiments are disclosed as part of the results shown to be achieved by the various devices, assemblages and several apparatus described and as steps that are inherent to utilization. They are simply the natural result of utilizing the devices, assemblages or several apparatus as intended and described. In addition, while some devices and apparatus are disclosed, it should be understood that these not only accomplish certain methods but also can be varied in a number of ways. Importantly, as to all of the foregoing, all of these embodiments are encompassed by this disclosure.

Further, each of the various elements or steps of the invention may also be achieved in a variety of manners. This disclosure should be understood to encompass each such variation, be it a variation of an apparatus embodiment, a method or process embodiment, or even merely a variation of any element of these. Particularly, it should be understood that as the disclosure relates to specific features of the invention, the words for each feature may be expressed by equivalent apparatus, device, assembly or method terms—even if only the function or result is the same. Such equivalent, broader, or even more generic terms should be considered to be disclosed for each element, step, or action. Such terms can be substituted where desired to make explicit the implicitly broad coverage to which this invention is entitled. As but one example, it should be understood that all actions or functions may be expressed as a means for taking that action or achieving that function, or as an element which causes that action or has that function. Similarly, each physical element disclosed should be understood to encompass a disclosure of the action or function which is facilitated by that physical element.

Any acts of law, statutes, regulations, or rules mentioned in this application for patent; or any patents, publications, or other references mentioned in this application for patent are hereby incorporated by reference. In addition, as to each term used it should be understood that unless its utilization in this application is inconsistent with such interpretation as would be understood by one of ordinary skill in the art from this disclosure, common dictionary definitions should be understood as incorporated for each term and all definitions, alternative terms, and synonyms such as contained in the Random House Webster's Unabridged Dictionary, second edition are hereby incorporated by reference. However, as to each of the above, to the extent that such references, information or statements incorporated by reference might be considered inconsistent with the patenting of the invention, such as contradicting disclosed features ascertained by a reading of these patent documents, such information and statements are expressly not to be considered incorporated by reference and more particularly as not made by the Applicant. Furthermore, as to any dictionary definition or other extrinsic evidence utilized to construe this disclosure, if more than one definition is consistent with the use of the words in the intrinsic record, the claim terms should be construed to encompass all such consistent meanings.

Furthermore, if or when used, the use of the transitional phrase "comprising" is used to maintain "open-end" disclosure herein, according to traditional disclosure and claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

I claim:

1. A conservation and control retention device, comprising:
   accessory device retention element comprising a remote control holder; and
   a conservation function element electrically connected with a power supply and at least one electronic device, wherein said conservation function element is responsive to a state of retention of an accessory device by said accessory device retention element.

2. The conservation and control retention device of claim 1, wherein said conservation function element is integral with said accessory device retention element.

3. The conservation and control retention device of claim 1, wherein said conservation function element comprises an electrical connection integral with said accessory device retention element.

4. The conservation and control retention device of claim 3, wherein said electrical connection comprises an electrical switch.

5. The conservation and control retention device of claim 4, wherein said electrical switch provides electrical disconnection of said power supply from said at least one electrical device.

6. The conservation and control retention device of claim 1, wherein said conservation function element provides electrical disconnection of said power supply from said at least one electrical device.

7. The conservation and control retention device of claim 1, wherein said conservation function element is responsive to a state of retention of an accessory device by said accessory device retention element by controlling the electrical connection of said power supply to said at least one electrical device.

8. A conservation and control retention device, comprising:
   an accessory device retention element; and
   a conservation function element electrically connected with a power supply and at least one electrical device, wherein said conservation function element is responsive to a state of retention of an accessory device by said accessory device retention element, including connecting said power supply to said at least one electrical device in response to said accessory device retention element not being in retention of the accessory device.

9. The conservation and control retention device of claim 7, wherein said conservation function element electrically disconnects said power supply from said at least one electrical device in response to said accessory device retention element having retained an accessory device.

10. A conservation and control retention device, comprising:
    an accessory device retention element; and
    a conservation function element electrically connected with a power supply and at least one electronic device, wherein said conservation function element is responsive to a state of retention of an accessory device by said accessory device retention element, including said conservation function element being responsive to the state of retention of the accessory device by said accessory device retention element by disconnecting power to said at least one electronic device corresponding in location to the accessory device.

11. The conservation and control retention device of claim 10, wherein said accessory device comprises a remote control.

12. A conservation and control retention device, comprising:
an accessory device retention element comprising a remote control retention element integral with said at least one electronic device; and
a conservation function element electrically connected with a power supply and said at least one electronic device, wherein said conservation function element is responsive to a state of retention of an accessory device by said accessory device retention element.

13. An electronic device comprising:
an accessory device retention element comprising a remote control holder; and
a conservation function element electrically connected with a power supply and at least one electrical device, wherein said conservation function element is responsive to a state of retention of an accessory device by said accessory device retention element.

14. The electronic device of claim 13, wherein said conservation function element comprises an electrical connection integral with said accessory device retention element.

15. The electronic device of claim 14, wherein said electrical connection comprises an electrical switch.

16. The electronic device of claim 15, wherein said electrical switch provides electrical disconnection of said power supply from said electrical device.

17. The electronic device of claim 13, wherein said conservation function element provides electrical disconnection of said power supply from said electrical device.

18. The electronic device of claim 1, wherein said conservation function element is responsive to a state of retention of an accessory device by said accessory device retention element by controlling the electrical connection of said power supply to said electrical device.

19. The electronic device of claim 18, wherein said conservation function element electrically connects said power supply to said electrical device in response to said accessory device retention element not having retained an accessory device.

20. The electronic device of claim 18, wherein said conservation function element electrically disconnects said power supply from said at least one electrical device in response to said accessory device retention element having retained an accessory device.

21. An electronic device, comprising:
an accessory device retention element; and
a conservation function element electrically connected with a power supply, wherein said conservation function element is integral with said accessory device retention element, and wherein said conservation function element disconnects power to an electrical device corresponding to the location of an accessory device.

22. The electronic device of claim 21, wherein said accessory device comprises a remote control.

23. A process of conservation by control of at least one electrical device, comprising:
providing a remote control holder for retention of an accessory device including a remote control for said at least one electrical device;
determining if the remote control is retained by the remote control holder; and
controlling the electrical connection of a power supply and said at least one electrical device responsive to said determining if the remote control is retained in the remote control holder.

24. The process of conservation by control of at least one electrical device as described in claim 23, wherein said determining if the remote control is retained by the remote control holder comprises actuating an electrical connection integral with said remote control holder.

25. The process of conservation by control of at least one electrical device as described in claim 24, wherein said actuating an electrical connection integral with said remote control holder comprises removing said remote control from the remote control holder.

26. The process of conservation by control of at least one electrical device as described in claim 24, wherein said actuating an electrical connection integral with said remote control holder comprises retaining the remote control with the remote control holder.

27. A process of conservation by control of at least one electrical device, comprising:
providing a remote control holder integral with said at least one electrical device for retention of a remote control for said at least one electrical device;
determining if the remote control is retained by the remote control holder; and
controlling the electrical connection of a power supply and said at least one electrical device responsive to said determining if the remote control is retained in the remote control holder.

28. The process of conservation by control of at least one electrical device as described in claim 27, wherein said controlling the electrical connection of a power supply and said at least one electrical device comprises electrically disconnecting the power supply from said at least one electrical device.

* * * * *